US006561327B1

(12) United States Patent
Godshaw

(10) Patent No.: US 6,561,327 B1
(45) Date of Patent: May 13, 2003

(54) WHEEL SYSTEM WITH SIDE WHEELS FOR LUGGAGE

(75) Inventor: Donald E. Godshaw, Evanston, IL (US)

(73) Assignee: Travel Caddy, Inc., Des Plaines, IL (US)

(*) Notice: Subject to any disclaimer, the term of this patent is extended or adjusted under 35 U.S.C. 154(b) by 0 days.

(21) Appl. No.: 09/839,007

(22) Filed: Apr. 20, 2001

Related U.S. Application Data

(60) Provisional application No. 60/198,892, filed on Apr. 21, 2000.

(51) Int. Cl.[7] ............................................. A47B 91/00
(52) U.S. Cl. ................................. 190/18 A; 16/47
(58) Field of Search .................... 190/115, 18 A, 190/37; 16/113.1, 47, 48; 280/47.315, 47.371, 37, 655

(56) References Cited

U.S. PATENT DOCUMENTS

| 13,853 | A | * | 1/1855 | Maring ................. 190/37 X |
| 4,457,045 | A | * | 7/1984 | Kegg ..................... 16/18 A |
| 5,374,073 | A | * | 12/1994 | Hung-Hsin ........... 190/18 A X |
| 5,511,806 | A | * | 4/1996 | McNair ................. 190/18 A |
| 5,564,538 | A | * | 10/1996 | Sadow .................. 190/18 A |
| 5,762,168 | A | * | 6/1998 | Miyoshi ................ 190/18 A |
| 5,815,885 | A | * | 10/1998 | Chen ..................... 16/47 |
| 5,890,570 | A | * | 4/1999 | Sadow .................. 190/18 A |
| 5,992,588 | A | * | 11/1999 | Morszeck ............. 190/18 A |

* cited by examiner

Primary Examiner—Nathan J. Newhouse
Assistant Examiner—Tri M. Mai
(74) Attorney, Agent, or Firm—Banner & Witcoff, Ltd.

(57) ABSTRACT

A dual wheel assembly is provided at each corner of an item of luggage to facilitate pulling of the luggage in any direction by means of a handle such as a telescopic handle of the luggage.

19 Claims, 1 Drawing Sheet

WHEEL SYSTEM WITH SIDE WHEELS FOR LUGGAGE

CROSS REFERENCE TO RELATED APPLICATION

This is a utility application based upon a previously filed provisional application, Ser. No. 60/198,892 filed Apr. 21, 2000, for which priority is claimed.

BACKGROUND OF THE INVENTION

In a principal aspect the present invention relates to a construction for the wheels utilized in combination with luggage. The use of wheels attached to the side of luggage containers is a common expedient. Wheels in combinations with luggage and with a handle are now common occurrences and many variations of products of this nature are available. Typically the wheels are provided in pairs and are attached to a lower edge of the luggage.

In this manner transport of the luggage in a particular direction or orientation is facilitated. However, in the event the user of the luggage desires to alter their direction or alter the orientation of the luggage, which is being transported via the wheels becomes impractical. In other words, the wheels area typically attached to the luggage with the intention that the luggage will be pulled along a surface in a particular direction and n a particular manner. The option or possibility of reorienting the luggage for pulling in a different direction is typically not a capability of wheeled system. Thus there has developed a need for a wheeled system which will enable alteration in the orientation of transport of the luggage by means of the wheels.

SUMMARY OF THE INVENTION

Briefly, the present invention comprises a wheel construction which may be positioned at the corners and preferably at three or four corners of a parallelpiped shaped luggage item wherein each wheel construction includes two wheels orientated at a 90 degree angle. In this manner the luggage may be toted or pulled along the ground in at least two directions. In a preferred embodiment such a wheel construction is attached to each of the four bottom corners of an item of luggage thus enabling transport of the luggage item in substantially any direction or orientation.

Thus it is an objection of the invention to provide improved wheel construct or housing for an item of luggage.

It is a further object of the invention to provide items of luggage wherein multiple sets of multiwheeled housings are attached to the item of luggage.

Yet another object of the invention is to provide a wheel construction wherein two wheels oriented at 90 degrees with respect to one another are provided at each corner of a luggage item on at least at three of the four corners of a parallelpiped item of luggage.

Yet another object of the invention is to provide a wheel housing which is lightweight, of simple construction, economical, and which does not take up inordinate space when attached to luggage thereby avoiding encroachment upon the capacity of an item of luggage.

There and other objects, advantages, and features of the invention will be set forth in greater detail in the description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
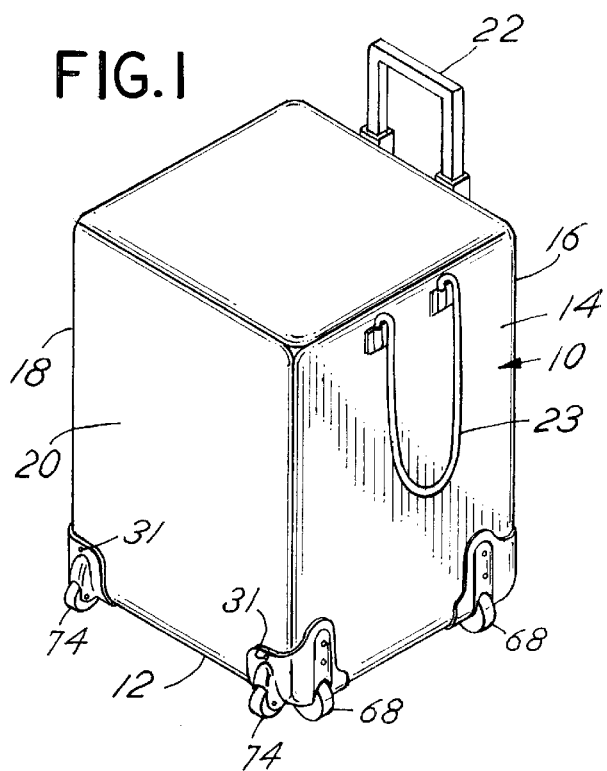
FIG. 1 is an isometric view of an item of luggage or a case which includes a wheel assembly positioned at each of the four corners of the rectangular base of the case.

Referring to the figures, an item of luggage or a carrying case 10 includes a base 12 and four upstanding side walls 14, 16, 18, 20 extending upwardly from each side of the rectangular base 12. A handle, such as a telescopic handle 22 may be incorporated in the case 10. A strap 23 or other alternative handle means may be provided attached to any side or edge of the luggage. Also the luggage may have alternate shapes yet still incorporate the wheels of the invention.

The luggage base 12 is generally rectangular in shape and includes four sides defining the base. In the embodiment depicted, a wheel assembly, as described below, is attached at each corner of the base 12 or, in other words, at the intersection of each pair of sides of the base 12. In a preferred embodiment, wheel assemblies are attached to at least two adjacent corners of the base 12. Alternatively, wheel assemblies are attached to two, three or four corners of the base 12.

Preferably, the separate wheel assemblies each have a substantially similar construction. Thus, a description of the wheel assembly depicted in FIGS. 2–4 shall apply to each and every corner wheel assembly, except to the extent that the wheel assemblies have a right hand or a left hand configuration. The wheel assemblies are designed to fit onto the corners of the base and include a means for attaching the wheel assemblies to the bottom and lateral sides which come together and join at the corners of the base and extend upwardly from the base.

Figure 4:
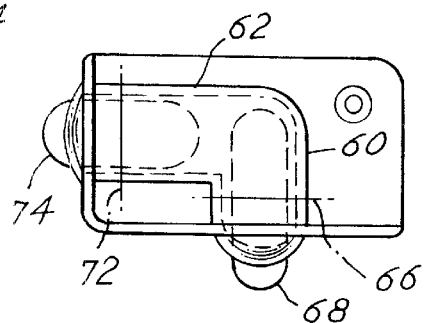
FIG. 4 is a top plan view of the wheel assembly of FIG. 2.
Figure 3:
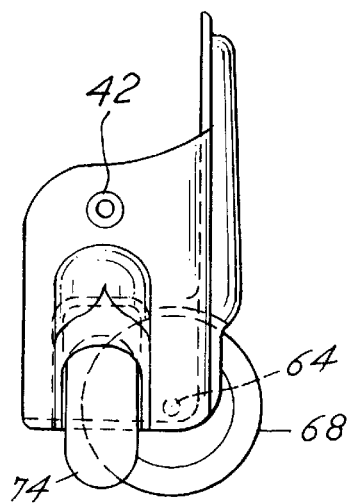
FIG. 3 is an end view of the wheel assembly of FIG. 2.
Figure 2:
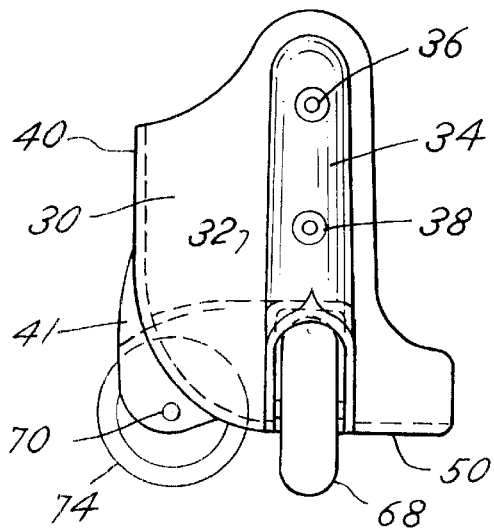
FIG. 2 is a side elevation of a wheel assembly.

Thus, referring to FIGS. 2–4, a typical wheel assembly includes a housing 30. The housing 30 is comprised of a vertically, upward, planar side panel 32. The panel 32 includes a molded rib 34, for example, with molded passages 36 and 38 therethrough for receipt and attachment of rivets to hold the panel 32 on a side, for example, side 20 of the luggage case 10. The side panel 32 is curved or formed to fit over the corner of the case 10.

The wheel assembly 30 further includes a second side panel 40 attached to the first side panel 32 at right angles thereto. The second side panel 40 includes a molded passage 42 for attaching a rivet or fastener therethrough to affix the side panel 40 to a side of the case 10.

The wheel assembly 30 further includes a reinforcing bottom or under side or panel 50 which constitutes a smooth continuation or curved wall of the side panel 40. Additionally, molded within the assembly, is a first channel 60 and an intersecting channel 62. The channels 60 and 62 intersect each other at right angles in plan view as illustrated in FIG. 4. The channel 60 includes an axle 64 extending between the sides of the channel 60 and defining an axis 66. The axle 64 supports a wheel 68 in the channel 60.

In a similar manner, an axle 70 is positioned in the channel 62 and defines an axis 72. A wheel 74 is supported by the axle 70. The axis 66 and 72 intersect at right angles to each other. Wheel 68 and wheel 74 are preferably non co-planar, as shown in FIG. 2, when the wheel assembly 30 is attached to the base 12. In any event the base 12 is maintained in a generally horizontal orientation by the wheels touching a support surface when the luggage is attached. Thus, the wheels 68 and 74 may serve as pads or supports to maintain the case 10 in a fixed supported position when the case 10 is not tilted and is in a rest or stationary position.

However, when the case is tilted, for example, by gripping of the handle 22, the case 10 will be tilted about the axis 66 or 72. Such tilting will cause the alternate wheels to be raised and disengaged from the surface. Thus, the case 10 may be towed or moved without engagement of the elevated wheels with a surface.

The wheels 68, 74 may also be arranged so that they are all simultaneously engaged with a flat planar surface. The choice of wheel diameter and the position of the respective rotational axes of the wheels will, in part, be dependent upon the size and shape of the luggage including the height and angle of inclination comfortable and practical for the luggage item. Importantly, pairs of wheels which provide rolling capability should be arranged with substantially identical axle position and wheel size, and such pairs are typically at opposite ends of a side of the luggage. In the embodiment depicted, the wheels 68, 74 have distinct diameters and the axles (64, 70) are not coplanar. However, pairs of same sized wheels 68, 74 are in identical orientation at opposite ends of each side of the base 12 of the luggage.

By maintaining the channels 60 and 62 at right angles and the respective axes 66 and 72 at right angles, as all the wheel assemblies 30 are mounted on corners of the base 12, it is possible to provide for support of the parallelpiped shaped case in the rest position or ease of transport of the case when it is tilted in any one of the four directions associated with the four sides of the case.

It is noted that the panel 40, insofar as the definition of the channel 62 is concerned, is comprised of outwardly extending flanges, such as flange 41, which support the axle 70 for the wheel 74. The axis 72 of the wheel 74 thus is generally aligned with the panel 40 to enhance the stability of the assembly. On the other hand, it is noted that the axis 66 and the axle 64 are recessed within the channel 60. Thus, the wheel 68 remains recessed relative to the associated side of the luggage case and does not project obtrusively therefrom. In this manner, the wheels are arranged so as not to protrude excessively from the sides of the case 10 thereby enabling the case 10 to conform with airline luggage carry on size requirements, for example.

In a preferred embodiment, the size of the wheels 68, 74 in any single housing is varied slightly. For example, wheels 74 may have a diameter less than wheels 68 and thus when the respective axles 70 and 64 are aligned or coplanar, the larger diameter wheels 68 will serve as luggage supports. However, either set of wheel 68, or 74 may facilitate movement of the luggage when the luggage is tilted to raise one set of wheels from a surface. By adjusting the diameter of wheels 16, 74 or the relative positive of the axles (64, 70) between non coplanar and planar, sets of two parallel wheels are oriented and maintained at the same elevation to facilitate luggage movements and avoid dragging of wheels arranged at right angles to each other.

It is possible to vary the construction described without departing from the intent and scope of the invention. For example, the two wheels associated with each housing may be oriented with respect to each other at angles other than 90° depending, in part, upon the shape of the case of luggage. The invention is therefore to be limited only by the following claims and equivalents thereof.

What is claimed is:

1. Portable luggage comprising, in combination:
   a luggage case having a four sided base and side panels attached to each side of the base, a corner at the intersection of each pair of adjacent sides forming the base, said base defining a plan view;
   a handle for toting the luggage; and
   a plurality of wheel assemblies affixed to the case at two adjacent corners of the base, each said wheel assembly including a single, unitary housing, each said housing including a first substantially vertical wheel channel and a second separate, substantially vertical wheel channel, said separate channels intersecting at an angle and each separate channel including an axle with a wheel mounted thereon, each of said wheel axles defining an axis, said axes together forming a substantially right angle in plan view, said wheels each having a surface engaging face projecting below the housing and the base for support of the base and permitting rotation of the wheels about their respective axles.

2. The luggage of claim 1 including said wheel assembly at more than two corners of the base.

3. The luggage of claim 1 wherein the base is rectangular and the axes are at a substantially right angle.

4. The luggage of claim 1 wherein the housing is comprised of a molded material having said first and second channels intersecting at the same angle as the angle of intersection of said axles.

5. The luggage of claim 1 wherein the surface engaging faces of the wheels in the housing are not co-planar when the base is horizontal.

6. The luggage of claim 1 wherein the surface engaging faces of the wheels in the housing are co-planar when the base is horizontal.

7. The luggage of claim 1 including said wheel assembly at three corners of the base.

8. The luggage of claim 1 wherein the unitary housing is comprised of a first vertical panel for attachment to one side panel of the case, a second vertical panel for attachment to another side panel of the case adjacent said one side panel of the case, and a bottom panel for engaging said base.

9. The luggage of claim 8 further including fasteners for attaching at least one panel of said housing to a side panel of the case.

10. The luggage of claim 8 wherein a side panel of said housing includes a molded rib.

11. The luggage of claim 1, 4, 5, 6, 7 or 8 wherein the axes are at substantially a right angle.

12. The luggage of claim 8 wherein the panels comprising the unitary housing are attached to the outside of the panels of the case.

13. The luggage of claim 1 further including fasteners for attachment to said housing to the case.

14. The luggage of claim 1 wherein the channels for the wheels are connected.

15. A wheel assembly for luggage comprising, in combination:
   a unitary housing, said housing including first and second generally vertical side panels, and a bottom panel connecting the side panels said side panels intersecting to define a corner, said housing further including a first integral wheel well in the first side panel and bottom panel and a second integral wheel well in the second side panel and bottom panel;
   a first axle and first wheel mounted thereon in the first wheel well; and a second axle and second wheel mounted thereon in the second wheel well, said axles intersecting at a substantially right angle said first and second wheels each including a surface engaging face spaced from the bottom panel of the housing.

16. The wheel assembly of claim 15 wherein the wheels have a different diameter.

17. The wheel assembly of claim 15 wherein the housing is a molded material.

18. The wheel assembly of claim 15 wherein the wheel wells are connected.

19. The wheel assembly of claims 15, 16, 17 or 18 in combination with a luggage case having a bottom and intersecting sides forming a case corner, said wheel assembly affixed to the case corner with the bottom panel engaging the case bottom and the side panels engaging case sides.

* * * * *